United States Patent

[11] 3,563,324

[72] Inventor: Ernst Lauber, Thun, Switzerland
[21] Appl. No.: 840,312
[22] Filed: July 9, 1969
[45] Patented: Feb. 16, 1971
[73] Assignee: Atlas Copco MCT AB, Stockholm, Sweden
[32] Priority: July 16, 1968
[33] Austria
[31] A6836/68

[54] MACHINE FOR CUTTING ROCK
12 Claims, 16 Drawing Figs.

[52] U.S. Cl. .................................................. 175/393; 299/81
[51] Int. Cl. .................................................. E21c 7/06, E21c 7/08
[50] Field of Search .................................. 299/81, 89; 175/69, 393

[56] References Cited
UNITED STATES PATENTS

| | | | |
|---|---|---|---|
| 1,473,498 | 11/1923 | Morgan | 299/89X |
| 2,693,950 | 11/1954 | Calder | 299/81X |
| 3,107,738 | 10/1963 | Osborn | 175/69X |
| 3,198,267 | 8/1965 | Madson | 175/69 |
| 3,290,097 | 12/1966 | Hlinsky et al. | 175/393X |
| 3,374,033 | 3/1968 | Arentzen | 299/81 |

Primary Examiner—David H. Brown
Attorney—Kurt Kelman

ABSTRACT: In a machine for cutting rock, a rotary cutter for cutting rock comprises a rotary cutter body having a forward end face and a plurality of cutting teeth mounted on said cutter body and spaced around the periphery thereof. Each of said cutting teeth has a cutting edge which is disposed radially beyond the periphery of said cutter body and axially beyond said forward end face. Each of said teeth also has a back surface adapted to define before said forward end face a clearance space with rock being cut by said cutting edge. A plurality of atomizing nozzles are mounted on said cutter body and have outlet ducts directed to said clearance spaces defined by said teeth when cutting in rock.

INVENTOR.
ERNST LAUBER

INVENTOR.
ERNST LAUBER

MACHINE FOR CUTTING ROCK

This invention relates to an apparatus for cooling the teeth in tunnel-driving machines, mining excavation machines or the like, which machines comprise rotary cutters which carry coolant nozzles and are set with detachable cutting teeth, which cut at the periphery of the cutter and are preferably provided with hard tips.

It is known to provide tunnel-driving and mining excavation machines with water-spraying devices, which serve above all to bind the dust which is produced by the cutting operation. It has been proposed for this purpose to spray water on the zone to be worked so that this zone is moistened before it is reached by the cutting tools. It is also known to feed water to the forward end portion of a hollow coal-cutting drum and to spray that water through bores spaced around the periphery of the drum onto the source of the dust. Such measures have not resulted in a substantial reduction of the amount of dust. For this reason, devices have been developed to suppress the dust at the very point where it is formed, namely, at the teeth itself. To that end, a liquid jet is directed onto the chip-guiding surface of the tooth with the object not only to suppress a formation of dust but also to cool the cutting edge. On the other hand, a cooling of teeth by liquid jets directed against the chip-guiding surfaces of the teeth involves severe disadvantages. When the cutting edge is cutting, the chip-guiding surface is covered by the rock to an extent which depends on the depth of cut so that the jet cannot reach the cutting edge. The continued movement of the tooth in the cutting direction then results in the severing of a chip along the shear line. The jet can reach the cutting edge at this time but as the rotation of the cutter continues the chip-guiding surface again contacts the rock so that the jet is deflected. Because these operations are repeated, it is not possible to effect an adequate cooling of the teeth. The recurring interruption of the jet often results in a quenching of the cutting tip so that the life of the cutting edge is reduced. Besides, in machines which serve to drive circular-section tunnels and comprise a rotating drum carrying the cutters, the teeth reach the bottom of the tunnel once in every revolution of the drum and must move through the excavated material lying on the bottom so that a cooling is impossible in this area.

During the driving in harder rock, the economic advantage of a driving machine over the usual blasting operations depends decisively on the tooth cost. The latter depends on the wear and life of the cutting edge. As in other machining operations, a large part of the energy available at the cutting edge of the tooth used to machine rock is converted into heat, which is mainly generated in three regions, namely, at the shear line due to the destruction of the molecular cohesion in the rock, at the point of contact between the chip and the chip-guiding surface of the tooth, and at the back face of the tooth. Frictional heat is generated in the two regions mentioned last so that very high temperature peaks occur in the hard tips within a closely confined zone. This heating results in a rapid decrease of the hardness of the tip material. Due to this reduction in hardness, the high pressures result in a plastic deformation of the material of the hard tips and the resulting heat cracks cause the cutting edge to break out. An effective cooling of the tooth and particularly of its cutting edge is highly important for an increased life of the tooth and a high economy of the machine operation. An effective cooling is essential for machining hard rock and it has been due to the lack of such cooling that the use of driving machines in hard rock has not been economical so far.

In addition to the fact that an adequate cooling of the teeth has not been possible so far, the following important drawbacks are inherent in apparatus by which only water or another liquid is sprayed alone under a suitable pressure. The discharge of the liquid jet from the nozzle results in the formation of relatively large drops and a thin layer of vapor is formed when said drops reach the tooth and particularly its hot cutting tip. The drops roll on said vapor layer so that a large part of the water is not evaporated but only heated and the amount of heat which can be dissipated is limited by the heat absorption capacity of the liquid whereas the much larger latent heat of vaporization cannot be absorbed. During the cutting operation, the microscopically small hills and valleys between the rock and the cutting tip form a maze of fine capillaries, which cannot receive large drops. Under the rough conditions at the rock face, the spraying nozzles may become clogged unless their diameter exceeds a certain limit. In nozzles large in diameter, water must be supplied at a high rate if a coherent jet is to be formed. Such water supplied at a high rate will completely slurry the excavated material and render its transportation more difficult. Besides, in certain kinds of rock the bottom of the tunnel is softened by water supplied in excess so that the capacity of the tunnel bottom to carry the subsequent machine is reduced. Moreover, there are construction projects in which only a limited amount of water is available or only a limited amount of water can be sprayed for operational reasons so that a spraying of water alone would involve an excessive consumption. If water or another liquid is sprayed, the rate at which such liquid is sprayed cannot be reduced below a certain limit if a sharp jet is to be produced. Hence, the water or liquid must be sprayed at a certain rate or the supply of liquid must be blocked altogether. This is unsatisfactory because the spraying action should be varied in adaptation to changing rock formations. In hard rock, more liquid should be sprayed to increase the cooling action. In soft rock, the rate at which liquid is sprayed should be reduced or be only so large as is required to bind the dust and moisten the debris.

Hence, it is an object of the invention to eliminate these disadvantages and provide an apparatus which ensures a fully effective cooling of the teeth as they cut into the rock, and which enables a reduction of the consumption of liquid coolant and a control of the rate of liquid coolant in adaptation to changing operating conditions, permits of an increase in the velocity of the jet and affords further advantages.

This object is accomplished according to the invention in that the coolant nozzles consist of atomizing nozzles adapted to be supplied with liquid coolant and compressed air, and the outlet ducts of the nozzles are directed into the clearance space which is disposed before the end face of the cutter between the back face of the tooth or cutting tip and the engaging rock of the tunnel face. If a jet is used which has this direction, which is determined by the outlet ducts of the atomizing nozzles, the tooth or cutting plate will be sprayed at a point which is never covered. This result will not depend on a specific shape of the tooth or a specific mounting of the cutting tips because any tooth or any cutting tip must define a clearance angle with the face of the tunnel. Above all, the liquid coolant reaches the corner at the leading end of the cutting tip or tooth in the direction in which the machine is propelled; this corner is subjected to the highest stress. The sprayed back face of the tooth or cutting tip will not be covered by the chips nor as it moves through the excavated material on the bottom of the tunnel because said material is pushed away by the teeth and does not remain in the clearance space which receives the jet. The cooling of the teeth is not interrupted during the cutting operation and is improved in that the liquid coolant is atomized with compressed air.

In the jet emerging from the atomizing nozzle, the liquid coolant or the water is so finely divided that the drops evaporate immediately as they reach the hot surface of the tooth or cutting tip. As a result, the quantity of heat which is extracted from the tooth or cutting tip is not limited by the heat absorption capacity of the liquid, as with large drops, but includes the much larger latent heat of vaporization so that the cooling effect is multiplied or a given cooling effect can be produced with a much smaller amount of liquid. The fine capillaries forming during the cutting operation between the rock and the tooth or cutting tip can receive the finely divided droplets as a result of the surface tension and the pressure drop between the atmosphere and the vacuum in the capillaries so that the liquid coolant reaches even portions which would otherwise be inaccessible. The air stream results in such a distribution of the jet that the liquid coolant reaches also the main cutting edge at the periphery of the cutter and has thus an additional cooling effect. When, in accordance with the invention, use is made of atomizing nozzles in which the water or liquid coolant is entrained and finely divided by the air, relatively small rates of water are sufficient to produce a coherent jet even where the nozzles or their outlet ducts are large in diameter. The water supplied at a small rate will moisten the debris only to the extent which is required to suppress a formation of dust whereas the bottom of the tunnel will not be softened. The use of air as a carrier for the liquid coolant results in high jet and impact velocities, which are required to avoid a deflection of the jet by fragments of rock falling down. Finally, when heading in rock where a production of much dust is to be feared, a foaming agent may be added to the liquid coolant before the atomizing nozzles. In that case, the development of foam will begin after the liquid has left the nozzles and the foam will embrace the cutter and the teeth. If water is sprayed alone, such an addition of a foaming agent is not desirable.

It is another feature of the invention that each atomizing nozzle is disposed between two adjacent teeth and comprises two outlet ducts, each of which is directed to one of the adjacent teeth. Hence, each tooth or cutting tip is impinged upon by two jets from different directions so that the supply of liquid coolant is ensured in any case.

In accordance with the invention, the rate and pressure of the liquid coolant and of the compressed air which are supplied to the atomizing nozzles are separately controlled. Hence, the rate at which water or liquid coolant is to be sprayed and the pressure of the jet can be varied within wide limits in adaptation to operating conditions. The control may be effected in a simple manner with the aid of reducing valves in the supply conduits and pressure gages associated with such valves.

In a development of the invention, each atomizing nozzle comprises an air supply pipe which coaxially extends into a diffuser and has a nozzlelike, constricted outlet, the liquid coolant supply conduit opens into the annular space which surrounds the air supply pipe, a constriction for the liquid coolant is provided at the outlet end of said annular space and consists preferably of a longitudinal slot in an insert, and the diffuser is closed by a nozzle tip which is formed with the outlet ducts. The constriction for the liquid coolant and the nozzlelike constricted outlet of the air supply pipe ensure the pressure rise which is required to enable a control of the liquid coolant. The diffuser is also required to enable a control of the pressure conditions in the nozzle so that the air will be under a superatmospheric pressure at the point where it receives the liquid coolant.

In the previous practice, the spraying operation is continuous during the operation of the machine because it is the main object to suppress a formation of dust during the cutting operation. In most cases, however, the teeth are not constantly cutting during a revolution of the cutter head but leave the range in which cutting is performed. As soon as the teeth cease to cut, no heat is supplied to them and a continued action of the liquid coolant would result in a quenching of the teeth or cutting tips, in heat cracks and subsequently a breakage of the cutting tip. The cooling originally intended to increase the edge life has then the opposite effect of increasing the tooth defects. This disadvantage is also eliminated by the invention in that in cutters having teeth which cut only in a certain angular range of their rotation the supply of coolant to these teeth is blocked during the rotation through the remaining angular range whereas the supply of compressed air is preferably maintained through the complete revolution of the cutter. Hence, the teeth are cooled only as long as they actually cut whereas the supply of liquid coolant ceases as soon as the teeth leave the actual cutting range. In order to prevent in such operation a clogging of the atomizing nozzles in the range in which no liquid is not sprayed, the supply of compressed air to the nozzles is maintained without change so that the compressed air which is then discharged alone prevents a clogging of the nozzle outlet ducts whereas an undesired rapid cooling of the teeth is avoided.

In order to accomplish this interruption of the supply of liquid coolant with structurally simple means, slip rings are provided for a supply of liquid coolant and of compressed air, respectively, into the conduit bores formed in the rotating cutter and leading to the atomizing nozzles, and the slip ring for the liquid coolant defines a distributing space, which extends only through an angle which corresponds to the range in which the teeth cut.

In accordance with the invention, the slip rings of all cutters consist of an identical casting of plastics material, which casting encloses an annular conduit for supplying liquid coolant or compressed air, which annular conduit is formed by a flexible tube of plastics material, the distributing space in said casting is formed by a peripheral groove, which is divided by a multiplicity of crosswebs into separate chambers, and ducts which must subsequently be pierced lead from these chambers to the annular conduit. Hence, identical castings may be used as slip rings having effective distributing spaces extending over different angles because it is sufficient to pierce the ducts of those chambers which correspond to the desired spraying range whereas the remaining chambers remain ineffective. By the use of identical castings of plastics material for all slip rings, the stocking of spare parts is simplified and the manufacture is less expensive because a single casting mold is sufficient.

An embodiment of the invention is shown by way of example in the accompanying drawing, in which.

Figures 10, 11, 12, 13, 14:
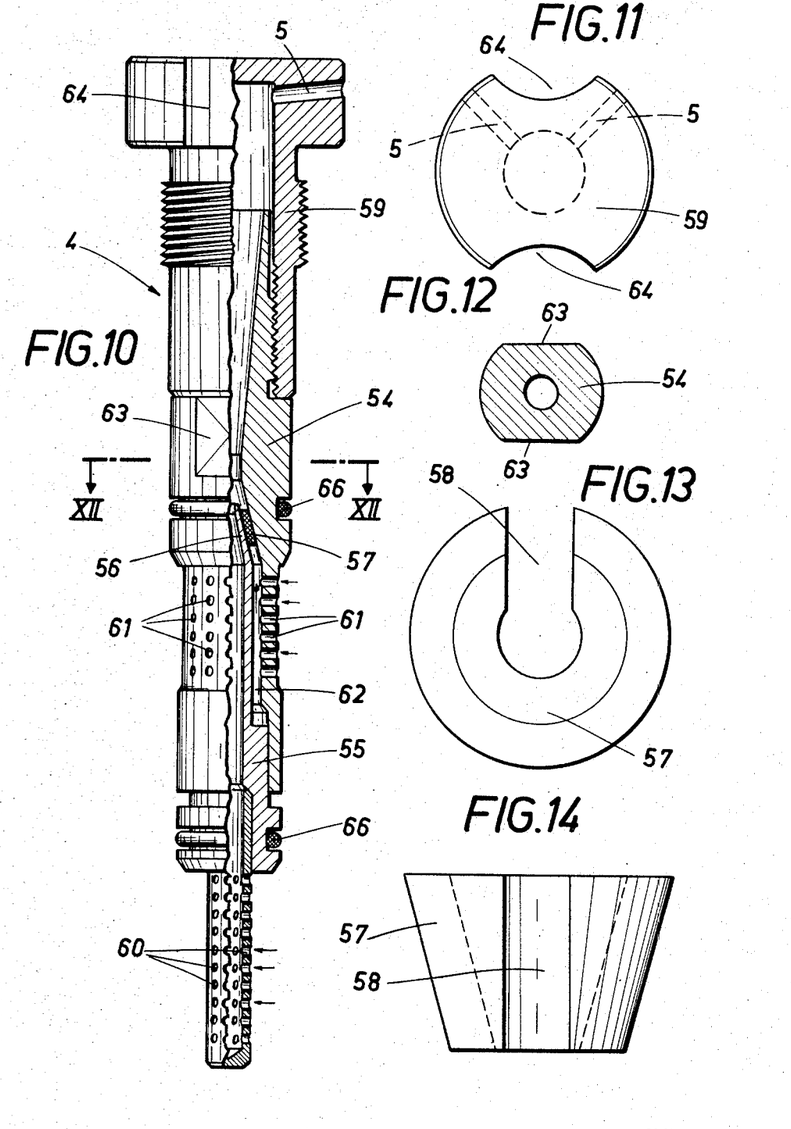
FIG. 10 is partly an elevation and partly a longitudinal sectional view showing on an enlarged scale an atomizing nozzle.
FIG. 11 is a top plan view showing the nozzle tip.
FIG. 12 is a transverse sectional view taken on line XII–XII in FIG. 10 and showing the diffuser.
FIGS. 13 and 14 are, respectively, an end elevation and side elevation showing on a still larger scale the constriction for the liquid coolant.

The rotating cutters 1 are set with a multiplicity of approximately radially inserted teeth 2, which cut at the periphery of the cutter and carry hard tips 3. Atomizing nozzles generally designated 4 are provided each between two teeth 2. With reference to FIGS. 10 and 11, the outlet ducts 5 of said nozzles are directed so that the emerging jets 6 enter the clearance space, which lies before the end face of the cutter and is defined by the back face 7 of the cutting tip 3 of each of the two adjacent teeth 2 and the face 8 of the tunnel. The atomizing nozzles 4 are supplied with water or another liquid coolant and with compressed air at the same time.

Figures 7, 8, 9:
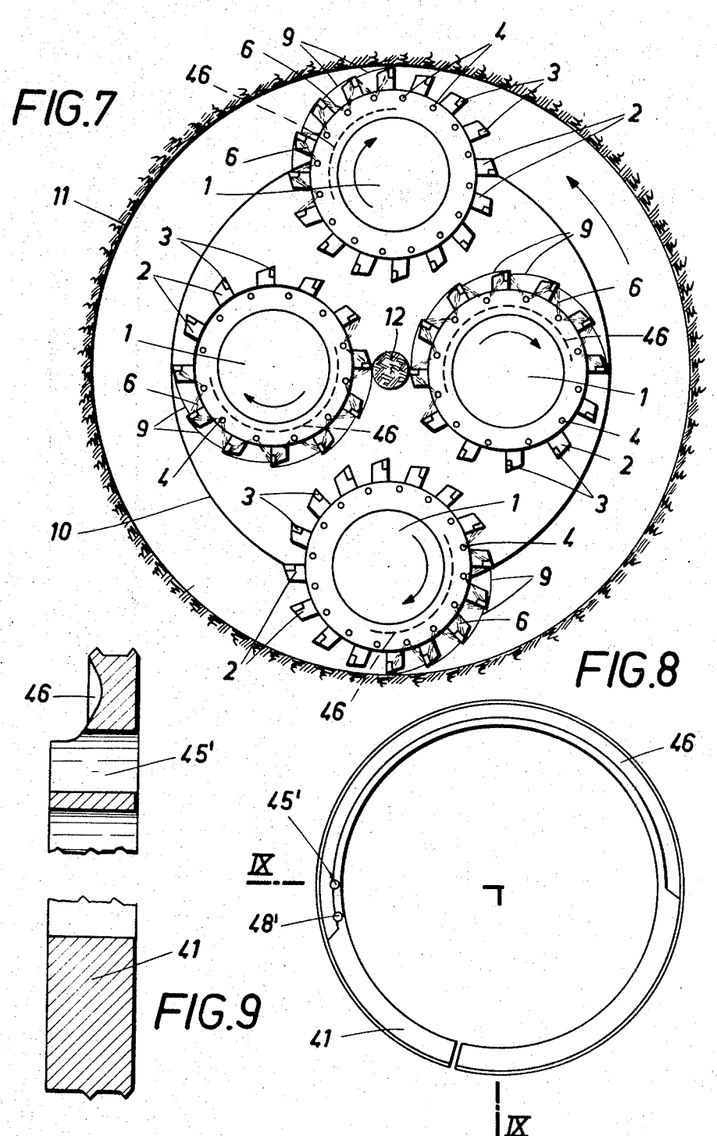
FIG. 7 is a transverse sectional view showing a cylindrical tunnel and the distribution and working ranges of the cutter.
FIG. 8 is an elevation showing a slip ring for a supply of liquid coolant.
FIG. 9 is a sectional view taken on line IX–IX in FIG. 8 and showing the slip ring.

In the distribution which is apparent from FIG. 7, the cutters 1 are mounted in a drum, not shown, which is rotatable in itself so that each tooth does not only rotate on its own axis but revolves about the drum axis, which coincides with the axis of the tunnel. This is indicated by corresponding arrows in FIG. 7. The drum is propelled in the direction of the tunnel axis by a propulsion device, not shown. The cutting path 9 of each tooth 2 is thus the result of the superposition of two rotational movements of the drum and cutter, respectively, and a longitudinal movement (feed). The two radially inner cutters cut a small tunnel 10, whereas the radially outer cutters, which are further to the rear in the axial direction, enlarge the precut tunnel 10 to the final size 11. A core 12 is left adjacent to the tunnel axis. As is also apparent from FIG. 7, liquid is sprayed only in that angular range of the rotation of the cutters 1 which corresponds to the actual cutting range, in which the cutting paths 9 result, whereas only compressed air is blown out in the remaining angular range of rotation.

Figure 3:
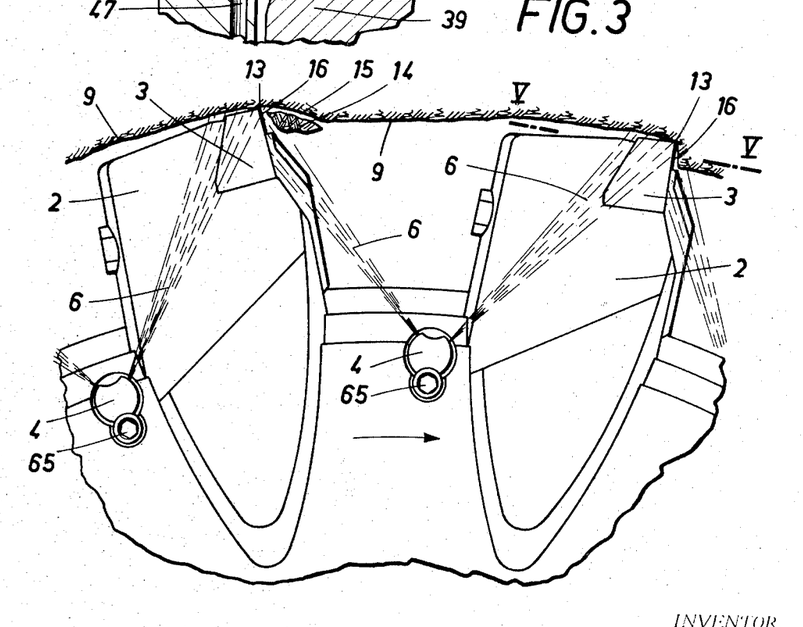
FIG. 3 is an end elevation showing a portion of the cutter.

The actual cutting operation is apparent from FIG. 3. The main cutting edges 13 of the cutting tips 3 sever chips 14 along the shear line 15. The chip-guiding face 16 of the cutting tips 3 is partly reached by the jet of the atomizing nozzle 4, which leads in the direction of rotation. Other jets 6 are directed into the space which is disposed in FIG. 3 behind the cutting tips 3, immediately behind the face of the tunnel, so that there is no covering of the cutting tips from the jet and no deflection of the jet during the cutting operation.

A rotation relative to the drum is imparted to the cutters 1 by a transmission which has a housing 17 that is firmly connected to the drum. The cutter is mounted on the transmission housing 17 with balls 18 (FIG. 1) interposed. An emergence of lubricant from the transmission is prevented by an oil seal ring 19. Another seal ring 20 prevents an ingress of water into the transmission. A compressor 21 is mounted on the propulsion machine behind the drum and supplies the compressed air which is required for the atomization and which flows in an air conduit 22 and a rotary coupling 25 to the center of the drum. The conduit 22 is provided with a shut-off valve 23 and a reducing valve 24. A pressure gage 26 is connected to the conduit 22 by a pressure gage shutoff valve 27 and serves to indicate the pressure which has been adjusted by the reducing valve 24. The rotary coupling 25 forms a connection between the stationary part of the heading machine and the drum. In the drum itself, flexible air tubes 28 extend to the four cutters 1 and are connected by a fitting 29 to an outer carrying ring 30.

The means for supplying water are basically the same. The heading machine carries a pump 31, which has a discharge conduit 32 provided with a shutoff valve 33 and leading through a reducing valve 34 to a rotary coupling 35. A pressure gage 36 and a pressure gage shutoff valve 37 are again provided. The water is conducted from the rotary coupling 35 in flexible tubes 38, which are secured to the external carrying ring 30 by fittings 29. The means for supplying compressed air and cooling water to the cutters 1 are only diagrammatically shown in FIGS. 1 and 2.

There is a relative rotation not only between the machine frame and the drum but also between each transmission housing 17 and the associated cutter head 1. The latter rotary movement must be accommodated by slip rings. An inner carrying ring 40 is mounted on the part 39 which is firmly connected to the transmission housing 17 and carries a slip ring 41 for the supply of water, a partitioning slip ring 42 and a slip ring 43 for a supply of compressed air. This arrangement is closed by the outer carrying ring 30. All slip rings are slotted and made from elastic material so that they can be removed when the split outer carrying ring 30 and an also slotted locking ring 44 have been removed whereas a further disassembly of the cutter 1 is not required.

A laterally apertured water pipe 45 extends through the slip rings. The cooling water which has left the flexible water tube 38 flows through the water pipe 45 into the distributing space 46 of the slip ring 41 and of the partitioning slip ring 42 and further through a short transverse bore into the water bore 47 of the cutter 1. The distributing space 46 does not extend around a full circle but, as is indicated in dotted lines in FIG. 7, only over that arc which corresponds to the actual cutting range of the teeth so that the supply of water is interrupted when the respective teeth emerge from the rock.

Compressed air is also supplied through a short pipe 48, which extends through the slip rings and supplies the compressed air to the distributing space 49 of the slip ring 43 and further into the bore 50 of the cutter head. The distributing space extends around a complete circle because compressed air is to be blown continuously. The bores formed in the slip ring 41 for the pipes 45 and 48 are designated 45' and 48' in FIGS. 8 and 9. An outer gasket 51 is inserted in a groove of the split fixing ring 44, which is secured to the transmission housing 17. This gasket prevents a supply of foreign matter and dirt to the slip rings.

Figure 4:
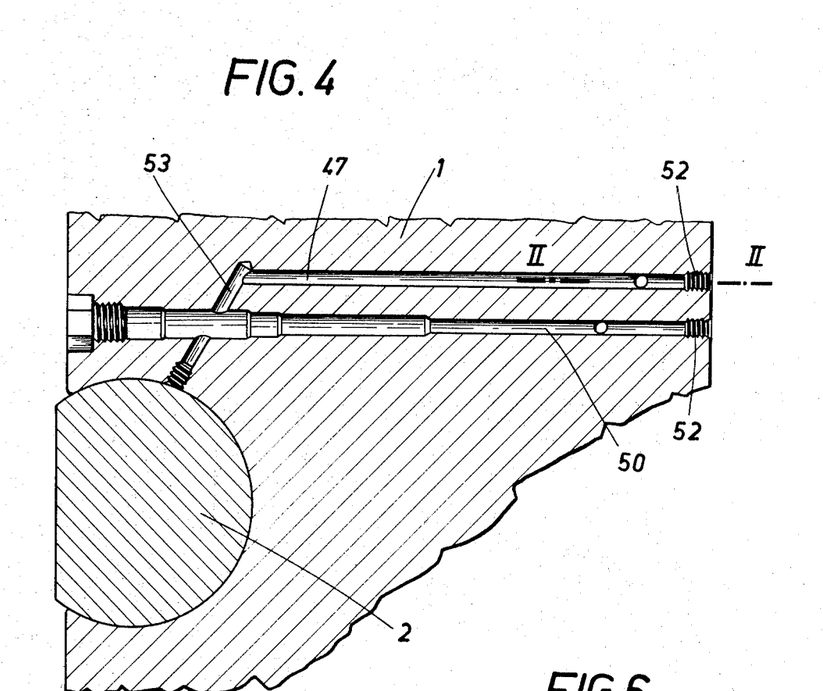
FIG. 4 is a sectional view taken on line IV–IV of FIG. 1 and showing the cutter.
Figure 5:
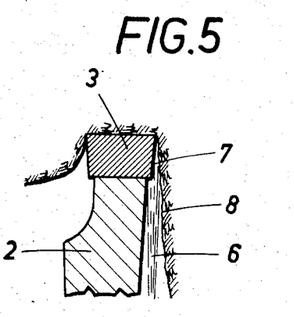
FIG. 5 is a sectional view taken on line V–V in FIG. 3 and showing a tooth.
Figure 6:
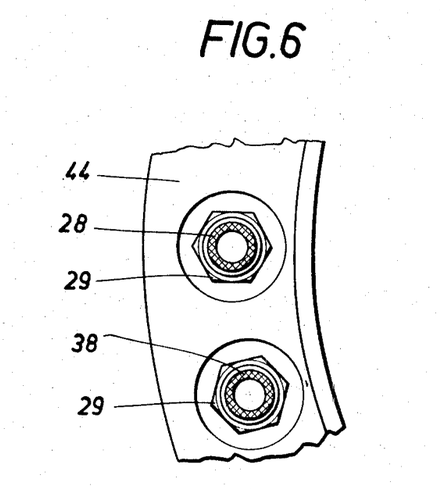
FIG. 6 is an end elevation showing a mounting ring with the flexible tubes for supplying water and compressed air.

The bore 50 for the supply of compressed air is enlarged at the end face of the cutter head and provided with a screw thread for threaded engagement with the atomizing nozzles. The bores 50 and 47 are closed at the rear by a plug 52. An oblique bore 53 (FIG. 4) extends from the bore 47 to the bore 40 so that water can be supplied to the atomizing nozzle 4 which is inserted in the bore 50.

Figure 1:
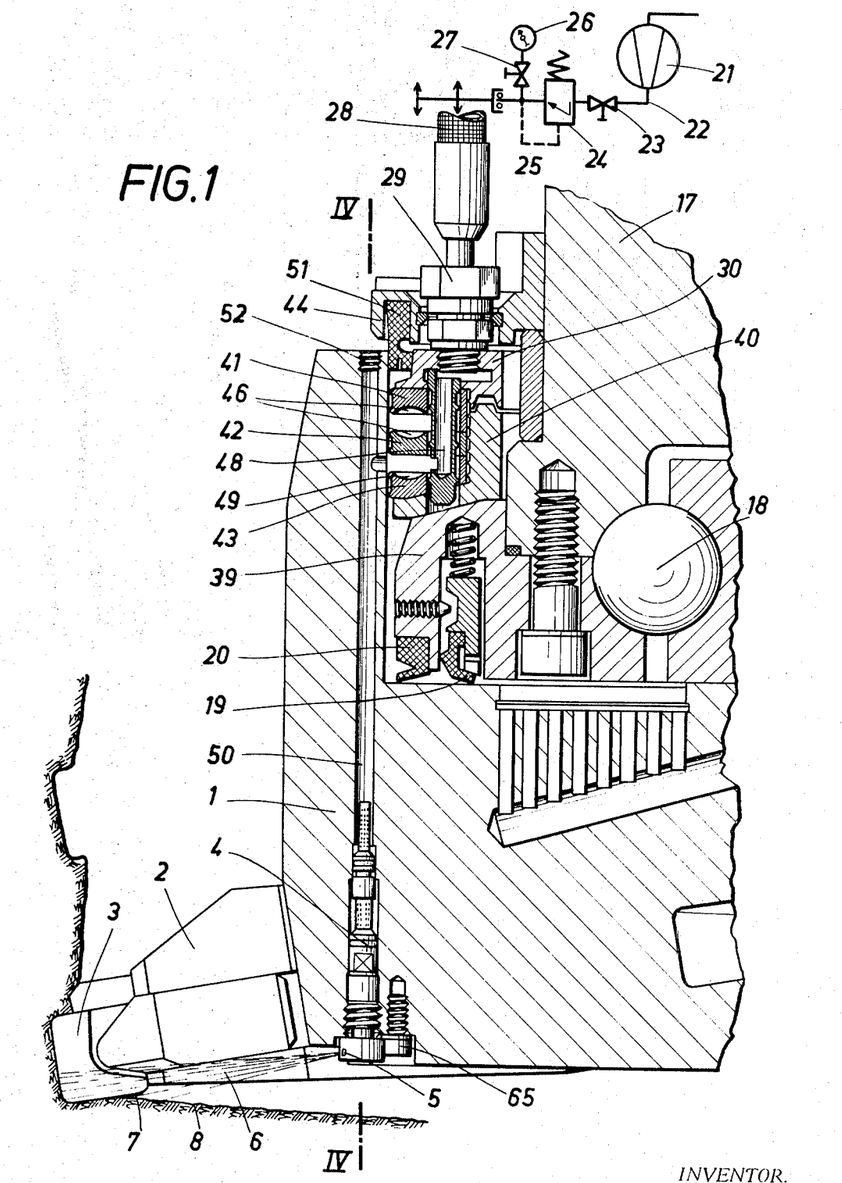
FIG. 1 is an axial sectional view showing a part of a cutter.
Figure 2:
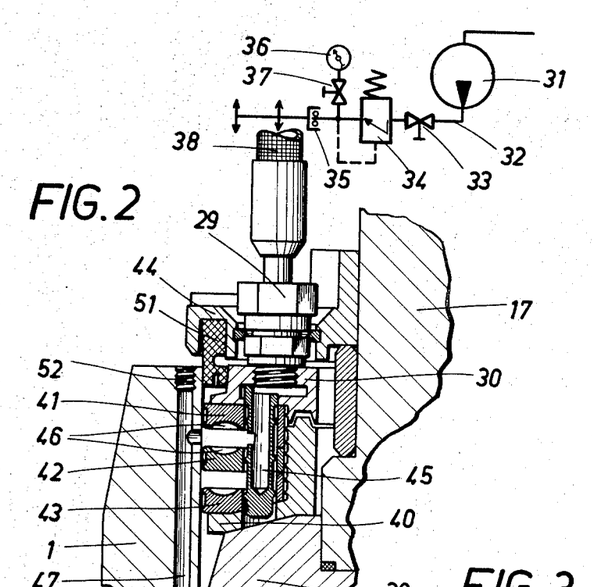
FIG. 2 is a sectional view taken on line II–II in FIG. 4 and showing the cutter.

In accordance with FIGS. 10 and 14, each atomizing nozzle consists of a diffuser 54, into which a nozzlelike restricted outlet 56 of an air supply pipe 55 protrudes coaxially. An insert 57 is provided adjacent to that air outlet 56 and comprises a longitudinal slot 58. The diffuser 54 is closed by a nozzle tip 59, in which the outlet ducts 5 are disposed. The compressed air flows from the bore 50 through numerous small holes 60 into the air supply pipe 55 and is discharged from the outlet 56 of the tube at high velocity. In the diffuser 54, the air is mixed with the cooling water, which through fine bores 61 provided at the periphery of the diffuser enters the annular space 62, which surrounds the pipe 55 and leaves the latter through the constriction formed by the longitudinal slot 58 of the insert 57. The compressed air which is mixed with the cooling water then leaves the nozzle through the outlet ducts 5 and forms the jets 6. To facilitate the screwing of the nozzle tip 59 and the diffuser 54 together, the latter has two mutually opposite wrench-engaging surfaces 63. The nozzle tip 59 is also provided with two peripheral recesses 64, which facilitate not only the screwing of the entire nozzle into the bore 50 but serve also to fix the nozzle tip in the proper angular position with the aid of a set screw 65 (FIGS. 1 and 3). Two seal rings 66 seal the air and water regions in the bore 50 from each other and seal the water region from the outside.

Figure 15:
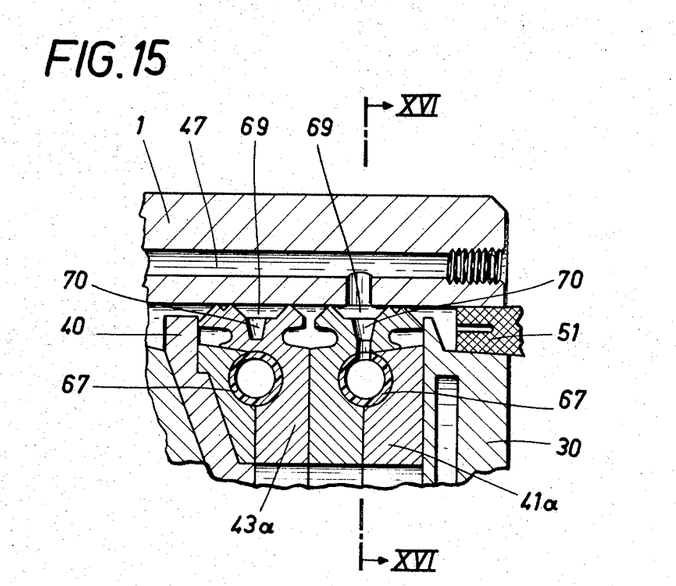
FIGS. 15 and 16 are an axial sectional view and a sectional view taken on line XVI–XVI in FIG. 15 and showing another design of a slip ring.
Figure 16:
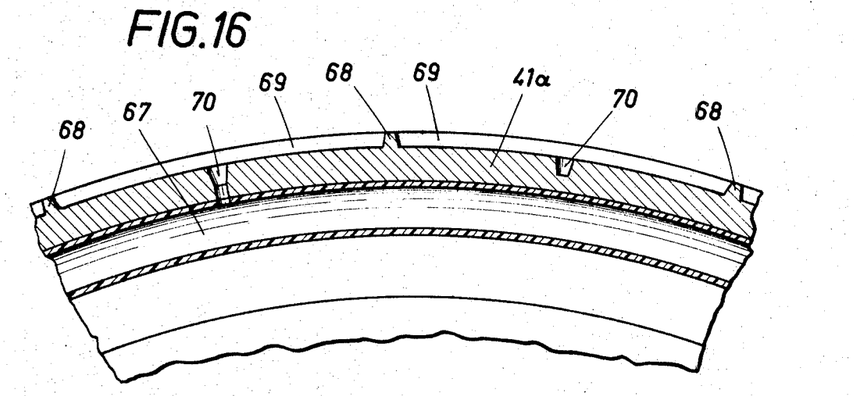

In the modification shown in FIGS. 15 and 16, the two slip rings 41a and 43a for the supply of water and compressed air consist of identical castings of plastics material. Identical castings form the bodies of the slip rings of all other cutters 1. Each of the two slip rings 41a and 43a encloses a flexible tube 67 of plastics material, which receives the liquid coolant or compressed air just as in the embodiment shown in FIGS. 1 and 2. The slip rings 41a and 43a are formed at their periphery with a groove, which is divided by transverse webs 68 into separate chambers 69. A preformed hole 70, which has not been pierced through, extends from each chamber 69 toward the tube 67. If the respective chamber 69 is intended to supply liquid coolant or compressed air to the bores 47 and 50, respectively, of the cutter, the hole is fully pierced with a suitable tool so that a communication to the flexible tube 67 is established.

I claim:
1. A rotary cutter for cutting rock, which comprises:
   a rotary cutter body having a forward end face;
   a plurality of cutting teeth mounted on said cutter body and spaced around the periphery thereof;
   each of said cutting teeth having a cutting edge which is disposed radially beyond the periphery of said cutter body and axially beyond said forward end face;
   each of said teeth also having a back surface adapted to define before said forward end face a clearance space with rock being cut by said cutting edge; and
   a plurality of atomizing nozzles mounted on said cutter body and having outlet ducts directed to said clearance spaces defined by said teeth when cutting in rock;
   each of said nozzles comprising liquid supply means and air supply means operable to jointly supply a liquid coolant and compressed air, respectively, through said outlet ducts.

2. A cutter as set forth in claim 1, in which each of said teeth comprises a hard tip which is formed with said cutting edge and said back surface.

3. A cutter as set forth in claim 1, in which each atomizing nozzle is disposed between two peripherally adjacent ones of said teeth and has two outlet ducts respectively directed toward said teeth.

4. A cutter as set forth in claim 1, which comprises separate and mutually independent valve means associated with said liquid supply means and air supply means, respectively, and adapted to control the pressure and rate of the fluid flowing therein.

5. A cutter as set forth in claim 1, in which each of said nozzles comprises:
- a diffuser having inlet and outlet ends;
- a nozzle tip closing said diffuser at said outlet end and formed with at least one of said outlet ducts;
- an air supply pipe forming said air supply means and coaxially extending into said diffuser from said inlet end thereof and having a nozzlelike constricted outlet portion;
- said diffuser defining with said air supply pipe an annular space around said air supply pipe; and
- a liquid supply pipe forming said liquid supply means and having a restricted outlet which opens into said annular space.

6. A cutter as set forth in claim 5, in which each of said liquid supply pipes comprises an insert having a longitudinal slot forming said restricted outlet.

7. A machine as set forth in claim 1, which comprises means for adding a foaming agent to said liquid coolant before said nozzles.

8. A machine for cutting rock, which comprises a support, and a plurality of cutters, each of which is rotatably mounted in said support and adapted to cut rock and comprises:
- a rotary cutter body having a forward end face;
- a plurality of cutting teeth mounted on said cutter body and spaced around the periphery thereof;
- each of said cutting teeth having a cutting edge which is disposed radially beyond the periphery of said cutter body and axially beyond said forward end face;
- each of said teeth also having a back surface adapted to define before said forward end face a clearance space with rock being cut by said cutting edge;
- a plurality of atomizing nozzles mounted on said cutter body and having outlet ducts directed to said clearance spaces defined by said teeth when cutting in rock;
- each of said nozzles comprising liquid supply means and air supply means operable to jointly supply a liquid coolant and compressed air, respectively, through said outlet ducts;
- each of said teeth being adapted to cut rock only in a predetermined angular range of its revolution;
- said machine further comprising valve means operable to supply liquid coolant to each of said nozzles only during a movement thereof inside said predetermined angular range; and
- means for supplying compressed air to each of said nozzles during a movement thereof inside and outside said predetermined angular range.

9. A machine as set forth in claim 8, which is adapted to supply compressed air to each of said nozzles throughout the revolution thereof.

10. A machine as set forth in claim 8, in which:
- each of said cutter bodies is formed with a plurality of peripherally spaced liquid supply bores and with a plurality of peripherally spaced air supply bores;
- each of said liquid supply bores is associated with one of said nozzles and communicates with said liquid supply means thereof;
- each of said air supply bores is associated with one of said nozzles and communicates with said air supply means thereof;
- said support carries in association with each of said cutter bodies a liquid supply slip ring held against rotation with said cutter body and having an arcuate distributing space arranged to communicate only with said liquid supply bores in said predetermined angular range; and
- said support carries in association with each of said cutter bodies an air supply slip ring held against rotation with said cutter body and having an arcuate distributing space communicating with said air supply bores and arranged to communicate with said air supply bores inside and outside said predetermined angular range.

11. A machine as set forth in claim 10, in which:
- all said slip rings comprise identical castings of plastics material;
- each of said liquid supply slip rings encloses an annular liquid supply conduit;
- each of said air supply slip rings encloses an annular air supply conduit;
- said distributing space of each slip ring consists of a peripheral groove, which contains a multiplicity of partitions dividing said distributing space into compartments; and
- an initially closed duct, which is adapted to be pierced, leads from each of said compartments to said annular conduit.

12. A machine as set forth in claim 10, in which each of said annular supply conduits consists of a flexible tube of plastics material.